United States Patent Office 2,929,844
Patented Mar. 22, 1960

2,929,844

N - (2,2 - DIALKOXYETHYL)-N-[(SUBSTITUTED-PHENYL)ALKYL]DIHALOACETAMIDES AND THEIR PREPARATION

Alexander R. Surrey, Albany, N.Y., assignor to Sterling Drug Inc., New York, N.Y., a corporation of Delaware No Drawing. Application July 3, 1957
Serial No. 669,710

12 Claims. (Cl. 260—562)

This invention relates to novel N-(2,2-dialkoxyethyl)-N-[(substituted-phenyl)alkyl]dihaloacetamides, to novel intermediate N-(2,2-dialkoxyethyl)-(substituted-phenyl)-alkylamines and to the preparation of these compounds.

The N-(2,2 - dialkoxyethyl) - N-[(substituted-phenyl)-alkyl]dihaloacetamides of my invention have the general Formula I

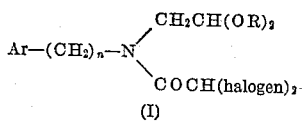

(I)

where Ar is a phenyl radical substituted by from one to three radicals selected from the group consisting of halogen, lower-alkoxy and lower-alkyl, $n$ is an integer from 1 to 2 inclusive and R is a lower-alkyl radical.

In the above Formula I the substituents of the phenyl radical designated as Ar can be in any of the five available positions of the phenyl nucleus, and where more than one, can be the same or different and can be in any of the various position combinations relative to each other. The halo substituents include chloro, bromo, iodo and fluoro. The lower-alkoxy and lower-alkyl substituents have preferably one to six carbon atoms, illustrated by methoxy, ethoxy, n-propoxy, isopropoxy, n-butoxy, isobutoxy, n-pentoxy, n-hexoxy and the like for lower-alkoxy; and methyl, ethyl, n-propyl, isopropyl, n-butyl, isobutyl, n-pentyl, n-hexyl and the like for lower-alkyl.

The lower-alkyl radicals of the above general Formula I, designated as R, has preferably from one to six carbon atoms and includes methyl, ethyl, n-propyl, isopropyl, n-butyl, isobutyl, n-pentyl, n-hexyl and the like, particularly preferred embodiments being methyl and ethyl.

The halogen atoms of the dihaloacetyl radicals of my compounds, designated in the above Formula I as —COCH(halogen)$_2$ can be chloro, bromo, iodo or fluoro, these dihaloacetyl radicals including dichloroacetyl, dibromoacetyl, diiodoacetyl, difluoroacetyl, bromochloroacetyl, bromoiodoacetyl, chloroiodoacetyl, and the like.

The compounds of my invention were prepared by reacting an N-(2,2'-dialkoxyethyl)-(substituted-phenyl)-alkylamine of the formula,

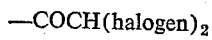

where Ar, $n$ and R have the meanings given above, with a dihaloacetyl halide. The halo radical attached to the carbonyl function was preferably chloro; however, other halo radicals, i.e., bromo, iodo or fluoro, also can be used. Illustrations of the process of my invention are: the preparation of N-(3,4-dibromobenzyl)-N-(2,2-diethoxyethyl)dibromoacetamide by reacting N-(2,2-diethoxyethyl)-3,4-dibromobenzylamide with dibromoacetyl bromide; the preparation of N-(4-n-butoxybenzyl)-N-(2,2-diethoxyethyl)dichloroacetamide by reacting N-(2,2-diethoxyethyl)-4-n-butoxybenzylamine with dichloroacetyl chloride; N-(4-isopropylbenzyl)-N-(2,2-di-n-propoxyethyl)diiodoacetamide by reacting N-(2,2-di-n-propoxyethyl) - 4 - isopropylbenzylamine with diiodoacetyl iodide; the preparation of N-[2-(2-chloro-4-ethoxyphenyl)ethyl] - N-(2,2 - diethoxyethyl)bromochloroacetamide by reacting N-(2,2-diethoxyethyl)-2-(2-chloro-4-ethoxyphenyl)ethylamine with bromochloroacetyl chloride. The reaction was carried out preferably below room temperature, with chilling as necessary.

The intermediate N-(2,2-dialkoxyethyl)-(substituted-phenyl)alkylamines were prepared by reacting the corresponding (substituted-phenyl)alkylamine of the formula Ar-(CH$_2$)$_n$-NH$_2$ with a di-(lower-alkyl)-acetal of a halo-acetaldehyde of the formula (halogen)—CH$_2$CH(OR)$_2$.

Preferred embodiments of my invention are the N-(2,2-dialkoxyethyl) - N-(halogenated - benzyl)dihaloacetamides having the Formula II

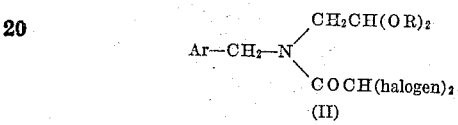

(II)

where Ar is a phenyl radical substituted by from one to three halo radicals and R is a lower-alkyl radical as defined hereinabove.

The chemical structures of the compounds of my invention are established by their mode of synthesis and corroborated by the correspondence of calculated and found values for elementary analyses for representative examples.

The N-(2,2 - dialkoxyethyl)-N-[(substituted - phenyl) - alkyl]-dihaloacetamides of my invention have valuable chemotherapeutic properties, in particular, amebacidal activity as determined in hamsters by standard procedures.

Another aspect of my invention resides in certain of the intermediate N - (2,2 - dialkoxyethyl) - (substituted-phenyl)alkylamines, specifically, the N-(2,2,-dialkoxyethyl)-(halogenated-phenyl)alkylamines having in free base form the following Formula III

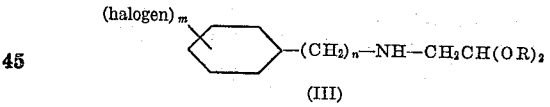

(III)

where $m$ is an integer from 1 to 3 inclusive, $n$ is an integer from 1 to 2 inclusive and R is a lower-alkyl radical. My invention comprehends not only these N-(2,2-dialkoxyethyl)-(halogenated-phenyl)alkylamines in their free base form, but also their acid-addition salts. These N-(2,2-dialkoxyethyl)-(halogenated-phenyl)alkylamines, in addition to being intermediates for the preparation of compounds of Formula I, have the additional and unusual utility, not found in the entire group of intermediates, in having anthelmintic activity.

My N-(2,2-dialkoxyethyl)-(halogenated-phenyl)alkylamines are useful in the free base form or in the form of acid-addition salts, and both forms are within the purview of the invention. The acids which can be used to prepare the acid-addition salts are preferably those which produce, when combined with the free base, pharmacodynamically acceptable salts, that is, salts whose anions are relatively innocuous to the animal organism in pharmacodynamic doses of the salts, so that the beneficial physiological properties inherent in the free base are not vitiated by side effects ascribable to the anions; in other words, the latter do not substantially affect the pharmacodynamic properties inherent in the cations. In practicing my invention, I found it convenient to employ the hydrochloride salt. However, other appropriate pharmacodynamically acceptable salts within the scope of the invention are those derived from mineral acids such as hydrobromic acid, hydriodic acid, nitric acid, phosphoric acid, and sulfuric acid; and organic acids such as acetic acid, citric acid, tartaric acid, lactic acid, ethanesulfonic acid, quinic acid, and the like, giving the hydrobromide, hydriodide, nitrate, phosphate, sulfate, acetate, citrate, tartrate, lactate, ethanesulfonate and quinate, respectively.

The acid-addition salts are prepared either by dissolving the free base in aqueous solution containing the appropriate acid and isolating the salt by evaporating the solution, or by reacting the free base and acid in an organic solvent, in which case the salt separates directly or can be obtained by concentration of the solution.

Although pharmacodynamically acceptable salts are preferred, all acid-addition salts are within the scope of my invention. All acid-addition salts are useful as sources of the free base form even if the particular salt per se is not desired as the final product, as for example when the salt is formed only for purposes of purification or identification, or when it is used as an intermediate in preparing a pharmacodynamically acceptable salt by ion exchange procedures.

The above-described N-(2,2-dialkoxyethyl)-(halogenated-phenyl)alkylamines have valuable chemotherapeutic properties, in particular, anthelmintic activity as determined in Swiss mice by standard procedures.

The following examples will further illustrate the invention without, however, limiting it thereto.

EXAMPLE 1

A. N-(2,2-dialkoxyethyl)-(substituted-phenyl)alkylamines

The preparation of these intermediate compounds is illustrated by the following preparation of N-(2,2-diethoxyethyl)-2,4-dichlorobenzylamine: A mixture of 80 g. of 2,4-dichlorobenzylamine and 30.5 g. of chloroacetaldehyde diethylacetal was heated on a steam bath with stirring for about fifty-four hours. An equal volume of ether was added and the solid which separated (42 g. of 2,4-dichlorobenzylamine hydrochloride) was filtered off. The ether was removed from the filtrate by distillation in vacuo and the residual material was distilled under reduced pressure. There was thus obtained 23.5 g. of N-(2,2-diethoxyethyl)-2,4-dichlorobenzylamine distilling at 124–132° C. at 0.5 mm.; $n_D^{25}=1.5160$.

Analysis.—Calcd. for $C_{13}H_{19}Cl_2NO_2$: Cl, 24.24. Found: Cl, 25.13, 25.08.

Treatment of N-(2,2-diethoxyethyl)-2,4-dichlorobenzylamine with an acid, e.g., HCl, results in the formation of the corresponding acid-addition salt, e.g., hydrochloride.

Other N-(2,2-dialkoxyethyl)-(substituted-phenyl)alkylamines that were prepared following the procedure described for the preparation of N-(2,2-diethoxyethyl)-2,4-dichlorobenzylamine using the appropriate reactants are given in Table A.

TABLE A

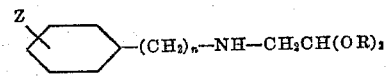

| No. | Z | n | R | Percent Yield | B.P., ° C. at mm. Hg | $n_D^{25}$ |
|---|---|---|---|---|---|---|
| 1 | 4—OC₄H₇—n | 1 | C₂H₅ | | 146 at 2.5 | 1.5090 |
| 2 | 4—C₃H₇—i | 1 | C₂H₅ | 60 | 102–108 at 0.25 | 1.4872 |
| 3 | 4—Cl | 2 | C₂H₅ | 69 | 101–105 at 0.17 | 1.4998 |
| 4 | 2—Cl | 1 | C₂H₅ | 65 | 96–102 at 0.2 | 1.5078 |
| 5 | 4—Cl | 1 | C₂H₅ | 74 | 99–103 at 0.15 | 1.5039 |
| 6 | 4—C₃H₇—i | 1 | CH₃ | 48 | 97 at 0.15 | 1.4955 |
| 7 | 4—Cl | 1 | CH₃ | 57 | 93–97 at 0.12 | 1.5130 |
| 8 | 2,4—Cl₂ | 1 | CH₃ | 59 | 98–106 at 0.12 | 1.5280 |

Elemental analyses of the compounds of Table A are given in Table B.

TABLE B

| No. | N Calcd. | N Found |
|---|---|---|
| 1 | (*) | (*) |
| 2 | 5.28 | 5.31 |
| 3 | 5.15 | 5.12 |
| 4 | 5.45 | 5.56 |
| 5 | 5.43 | 5.62 |
| 6 | 5.90 | 5.87 |
| 7 | 6.10 | 6.14 |
| 8 | 5.30 | 5.42 |

* Calcd.: C, 69.11; H, 9.89. Found: C, 71.47; H, 9.38.

Other N-(2,2-dialkoxyethyl)-(substituted-phenyl)alkylamines that can be prepared according to the above procedure using equivalent quantities of the appropriate reactants include the following: N-(2,2-di-n-propoxyethyl)-2,4-dibromobenzylamine using 2,4-dibromobenzylamine and chloroacetaldehyde di-n-propylacetal; N-(2,2-diisobutoxyethyl)-3-iodobenzylamine using 3-iodobenzylamine and chloroacetaldehyde diisobutylacetal; N-(2,2-di-n-hexoxyethyl)-2-(3,4,5-trimethoxyphenyl)-ethylamine using 2-(3,4,5-trimethoxyphenyl)ethylamine and chloroacetaldehyde di-n-hexylacetal; N-(2,2-diethoxyethyl)-3-isopropylbenzylamine using isopropylbenzylamine and chloroacetaldehyde diethylacetal; N-(2,2-diethoxyethyl)-4-fluorobenzylamine using 4-fluorobenzylamine and chloroacetaldehyde diethylacetal; N-(2,2-diethoxyethyl)-2,4,6-trichlorobenzylamine using 2,4,6-trichlorobenzylamine and chloroacetaldehyde diethylacetal; N-(2,2-dimethoxyethyl)-2-(3-methoxy-4-isopropylphenyl)ethylamine using 2-(3-methoxy-4-isopropylphenyl)ethylamine and chloroacetaldehyde dimethylacetal; N-(2,2-diethoxyethyl)-2-n-propoxy-4-chlorobenzylamine using 2-n-propoxy-4-chlorobenzylamine and chloroacetaldehyde diethylacetal; N-(2,2-diethoxyethyl)-4-n-butoxybenzylamine using 4-n-butoxybenzylamine and chloroacetaldehyde diethylacetal; N-(2,2-diethoxyethyl)-4-n-hexoxybenzylamine using 4-n-hexoxybenzylamine and chloroacetaldehyde diethylacetal; N-(2,2-diethoxyethyl)-2,4,6-trimethylbenzylamine using 2,4,6-trimethylbenzylamine and chloroacetaldehyde diethylacetal; N-(2,2-diethoxyethyl)-4-n-hexylbenzylamine using 4-n-hexylbenzylamine and chloroacetaldehyde diethylacetal; and the like.

The intermediate N-(2,2-dialkoxyethyl)-(substituted-phenyl)alkylamines can be isolated as their free bases or in the form of their acid-addition salts, e.g., hydrochlorides. The following preparation illustrates the formation and isolation of one of these compounds as its salt.

A mixture of 7.5 g. of 3,4-dichlorobenzylamine and 30.5 g. of chloroacetaldehyde diethylacetal was heated on a steam bath with stirring for about seven hours. An equal volume of ether was added and the solid which separated was filtered off. The ether was removed from the filtrate by distillation in vacuo and the residual material was distilled under reduced pressure. There was thus obtained 21 g. (36% yield) of N-(2,2-diethoxyethyl)-3,4-dichlorobenzylamine, distilling at 116–120° C. at 0.10 mm., $n_D^{22}=1.5120$.

Analysis.—Calcd. for $C_{13}H_{19}Cl_2NO_2$: N, 4.79. Found: N, 4.66.

To 5 g. of N-(2,2-diethoxyethyl)-3,4-dichlorobenzylamine in free base form was added 2.6 ml. of 6.5 N ethanolic hydrogen chloride in ether. The solid that separated was collected and washed well with ether. There was thus obtained 3.0 g. of N-(2,2-diethoxyethyl)-3,4-dichlorobenzylamine hydrochloride, M.P. 135.8–137.0° C. (corr.).

Analysis.—Calcd. for $C_{13}H_{19}Cl_2NO_2 \cdot HCl$: Cl⁻, 10.77;

C, 47.51; H, 6.13. Found: Cl⁻, 10.92; C, 46.94; H, 6.08.

My N-(2,2-dialkoxyethyl) - halogenated - benzylamines (Formula III) when administered orally to Swiss mice infected with Hymenolepis nana were found to clear half of the animals at doses of about 500 mg. per kg. per twelve hours for a period of four days, e.g., N-(2,2-diethoxyethyl)-3,4-dichlorobenzylamine as its monohydrochloride was found to clear 40% of the animals at a dose level of 400 mg. per kg. My N-(2,2-dialkoxyethyl)-halogenated-benzylamines can be formulated in the same manner as conventional anthelmintics such as piperazine or hexylresorcinol preparations.

B. *N-(2,2-dialkoxyethyl)-N-[(substituted-phenyl)alkyl]-dihaloacetamides*

The preparation of these compounds is illustrated by the following preparation of N-(2,4-dichlorobenzyl)-N-(2,2-diethoxyethyl)dichloroacetamide: A solution of 16.2 g. of dichloroacetyl chloride in 50 ml. of ethylene dichloride was added dropwise with stirring and cooling to a mixture of 29.2 g. of N-(2,2-diethoxyethyl)-2,4-dichlorobenzylamine in 200 ml. of ethylene dichloride and 200 ml. of 1 N sodium hydroxide solution. The temperature was kept below 5° C. by means of an ice-salt bath. After the addition had been completed, the mixture was allowed to warm up to room temperature with stirring. One-half of the ethylene dichloride layer was worked up in the following manner. It was washed twice with water, twice with 2 N hydrochloric acid and then with water, and dried over anhydrous calcium sulfate. After the solvent had been removed by distilling under reduced pressure, the residual material (16.5 g., 82% yield) was allowed to stand until crystallization occurred. The crystalline material was then recrystallized three times from isopropanol to give 7 g. of the product, N-(2,4-dichlorobenzyl)-N-(2,2 - diethoxyethyl)dichloroacetamide, as a colorless crystalline solid melting at 103.6–107.4° C. (corr.).

Analysis.—Calcd. for $C_{15}H_{19}Cl_4NO_3$: $Cl_{D.C.}$, 35.17; $Cl_{KOH}$, 17.58. Found: $Cl_{D.C.}$, 34.96; $Cl_{KOH}$, 18.01. $Cl_{D.C.}$ means total chlorine and $Cl_{KOH}$ means dichloroacetyl chlorine.

Other N-(2,2-dialkoxyethyl)-N-[(substituted-phenyl)-alkyl]dihaloacetamides that can be prepared according to the above procedure using equivalent quantities of the appropriate reactants include the following: N-(2,2-di-n-propoxyethyl)-N-(2,4 - dibromobenzyl)dibromoacetamide using N-(2,2-di-n-propoxyethyl)-2,4-dibromobenzylamine and dibromoacetyl bromide; N-(2,2-diisobutoxyethyl)-N-(3-iodobenzyl)diiodoacetamide using N-(2,2-diisobutoxyethyl)-3-iodobenzylamine and diiodoacetyl iodide; N-(2,2-diethoxyethyl)-N-(2,4 - dichlorobenzyl)difluoroacetamide using N-(2,2-diethoxyethyl)-2,4-dichlorobenzylamine and difluoroacetyl fluoride; N-(2,2-diethoxyethyl)-N-(4-fluorobenzyl)dichloroacetamide using N-(2,2-diethoxyethyl)-4-fluorobenzylamine and dichloroacetyl chloride; N-(2,2-diethoxyethyl) - N - (2,4 - dichlorobenzyl)bromochloroacetamide using N-(2,2-diethoxyethyl)-2,4-dichlorobenzylamine and bromochloroacetyl chloride; N-(2,2-diethoxyethyl)-N-(2,4,6-trichlorobenzyl)dichloroacetamide using N-(2,2-diethoxyethyl) - 2,4,6 - trichlorobenzylamine and chloroacetyl chloride; N-(2,2-diethoxyethyl)-N-(2-n-propoxy-4-chlorobenzyl)dichloroacetamide using N-(2,2-diethoxyethyl)-2-n-propoxy - 4 - chlorobenzylamine and dichloroacetyl chloride; and the like.

EXAMPLE 2

*N - (2,2 - diethoxyethyl) - N - [2 - (4 - chlorophenyl)-ethyl]dichloroacetamide*

The preparation of this compound was carried out following the procedure described in Example 1B using 7.9 g. of dichloroacetyl chloride and 13.2 g. of N-(2,2-diethoxyethyl)-2-(4-chlorophenyl)ethylamine. There was thus obtained 4.5 g. of the product, N-(2,2-diethoxyethyl)-N - [2 - (4 - chlorophenyl)ethyl]dichloroacetamide, M.P. 83.0–85.2° C. (corr.) when recrystallized once from isopropanol and once from benzene-n-pentane.

Analysis.—Calcd. for $C_{16}H_{22}Cl_3NO_3$: $Cl_{D.C.}$, 27.80; $Cl_{KOH}$, 18.75. Found: $Cl_{D.C.}$, 27.48; $Cl_{KOH}$, 18.52.

EXAMPLE 3

*N-(2,2-dimethoxyethyl)-N-(4-isopropylbenzyl)-dichloroacetamide*

This preparation was carried out following the procedure described in Example 1B using 10.9 g. of N-(2,2-dimethoxyethyl)-4-isopropylbenzylamine and 7.4 g. of dichloroacetyl chloride. There was thus obtained 6.4 g. of the product, N-(2,2-dimethoxyethyl)-N-(4-isopropylbenzyl)dichloroacetamide, distilling at 135° C. at 0.008 mm.; $n_D^{26.5} = 1.5194$.

Analysis.—Calcd. for $C_{16}H_{23}Cl_2NO_3$: C, 55.16; H, 6.65; Cl, 20.35. Found: C, 54.87; H, 6.37; Cl, 20.15.

Other N-(2,2-dialkoxyethyl)-N-[(substituted-phenyl)-alkyl]dihaloacetamides that can be prepared according to the above procedure using equivalent quantities of the appropriate reactants include the following: N-(2,2-diethoxyethyl)-N-(3-isopropylbenzyl)dichloroacetamide using N-(2,2-diethoxyethyl)-3-isopropylbenzylamine and dichloroacetyl chloride; N-(2,2-dimethoxyethyl)-N-[2-(3-methoxy-4-isopropylphenyl)ethyl]dichloroacetamide using N-(2,2-dimethoxyethyl)-2-(3-methoxy-4-isopropylphenyl)ethylamine and dichloroacetyl chloride; N-(2,2-diethoxyethyl)-N-(2,4,6-trimethylbenzyl)dichloroacetamide using N-(2,2-diethoxyethyl)-2,4,6-trimethylbenzylamine and dichloroacetyl chloride; N-(2,2-diethoxyethyl)-N-(4-n-hexylbenzyl)dibromoacetamide using N-(2,2-diethoxyethyl)-4-n-hexylbenzylamine and dibromoacetyl bromide; and the like.

EXAMPLE 4

*N-(2,2-diethoxyethyl)-N-(4-n-butoxybenzyl)-dichloroacetamide*

Following the procedure described in Example 1B using equivalent quantities of N-(2,2-diethoxyethyl)-4-n-butoxybenzylamine and dichloroacetyl chloride, the resulting product is N-(2,2-diethoxyethyl)-N-(4-n-butoxybenzyl)dichloroacetamide.

Other N-(2,2-dialkoxyethyl)-N-[(substituted-phenyl)-alkyl]dihaloacetamides that can be prepared according to the above procedure using equivalent quantities of the appropriate reactants include the following: N-(2,2-di-n-hexoxyethyl)-N-[2 - (3,4,5 - trimethoxyphenyl)ethyl]dichloroacetamide using N-(2,2-di-n-hexoxyethyl)-2-(3,4,5-trimethoxyphenyl)ethylamine and dichloroacetyl chloride; N-(2,2-diethoxyethyl)-N-(4-n-hexoxybenzyl)dichloroacetamide using N-(2,2-diethoxyethyl)-4-n-hexoxybenzylamine and dichloroacetyl chloride; N-(2,2-diethoxyethyl)-N-(4-n-butoxybenzyl)dibromoacetamide using N-(2,2-diethoxyethyl)-4-n-butoxybenzylamine and dibromoacetyl bromide; and the like.

EXAMPLE 5

*N - (2,2 - dimethoxyethyl) - N - (2,4 - dichlorobenzyl)-dichloroacetamide*

This preparation was carried out following the procedure described in Example 1B using 13.2 g. of N-(2,2-dimethoxyethyl)-2,4-dichlorobenzylamine and 8.1 g. of dichloroacetyl chloride. There was thus obtained 9.3 g. of the product, N-(2,2-dimethoxyethyl)-N-(2,4-dichlorobenzyl)dichloroacetamide, distilling at 147° C. at 0.010 mm.; $n_D^{27} = 1.5468$.

Analysis.—Calcd. for $C_{13}H_{15}Cl_4NO_3$: C, 41.60; H, 4.03; $Cl_{KOH}$, 18.91; $Cl_{D.C.}$, 37.82. Found: C, 40.33; H, 4.11; $Cl_{KOH}$, 19.17; $Cl_{D.C.}$, 37.03.

EXAMPLE 6

N-(2,2-diethoxyethyl)-N-(4-chlorobenzyl)dichloroacetamide

This preparation was carried out following the procedure described in Example 1B using 12.9 g. of N-(2,2-diethoxyethyl)-4-chlorbenzylamine and 8.1 g. of dichloroacetyl chloride. There was thus obtained 10.6 g. of the product, N - (2,2 - diethoxyethyl) - N - (4-chlorobenzyl)-dichloroacetamide, distilling at 139–143° C. at 0.007 mm.; $n_D^{25}$=1.5366.

Analysis.—Calcd. for $C_{15}H_{20}Cl_3NO_3$: $Cl_{D.C.}$, 28.86. Found: $Cl_{D.C.}$, 27.65.

EXAMPLE 7

N-(2,2-diethoxyethyl)-N-(2-chlorobenzyl)dichloroacetamide

Following the procedure described in Example 1B using 12.7 g. of N-(2,2-diethoxyethyl)-2-chlorobenzylamine and 8.0 g. of dichloroacetyl chloride, there was obtained 6.8 g. of the product, N-(2,2-diethoxyethyl)-N-(2-chlorobenzyl)dichloroacetamide, distilling at 142° C. at 0.008 mm.; $n_D^{25.5}$=1.5253.

EXAMPLE 8

N-(2,2-diethoxyethyl)-N-(4-isopropylbenzyl)dichloroacetamide

Following the procedure described in Example 1B using 9.4 g. of N-(2,2-diethoxyethyl)-4-isopropylbenzylamine and 6.6 g. of dichloroacetyl chloride, there was obtained 3.3 g. of the product, N-(2,2-diethoxyethyl)-N - (4 - isopropylbenzyl)dichloroacetamide, distilling at 148° C. at 0.010 mm.; $n_D^{25}$=1.5150.

Analysis.—Calcd. for $C_{18}H_{27}Cl_2NO_3$: $Cl_{KOH}$, 18.84. Found: $Cl_{KOH}$, 19.41.

The N - (2,2-dialkoxyethyl) -N- [(substituted-phenyl)alkyl]dihaloacetamides of the foregoing examples when administered orally to hamsters infected with *Endamoeba criceti* were found to completely clear the animals at drug levels below 200 mg. per kg of body weight per day. Some of the compounds, for instance, N-(2,2-diethoxyethyl)-N-(2,4-dichloromenzyl)dichloroacetamide and N-(2,2 - dimethoxyethyl) - N - (4 - isopropylbenzyl)-dichloroacetamide, have $ED_{50}$ values below 50 mg. per kg. per day, $ED_{50}$ meaning the effective dose necessary to clear 50% of the hamsters of the amebic infection. In contrast to this high activity, my compounds have very low toxicity. For example, N-(2,2-diethoxyethyl)-N-(2,4-dichlorobenzyl)dichloroacetamide has an acute oral $ALD_{50}$ in mice of greater than 8,000 mg. per kg. and N - (2,2 - dimethoxyethyl) - N - (4 - isopropylbenzyl)-dichloroacetamide has an acute oral $ALD_{50}$ in mice of greater than 4,000 mg. per kg.

My new N - (2,2 - dialkoxyethyl) - N - [(substituted-phenyl)alkyl]dihaloacetamides are best administered orally in solid form with the aid of a carrier. Thus, the compounds can be formulated in unit dosage form as tablets in combination with an adjuvant such as one or more of the following: calcium carbonate, starch, gelatin, talc, magnesium stearate, acacia, and the like, or, alternatively, they can be employed in capsule form either alone or admixed with an adjuvant. My compounds also can be advantageously combined with other amebacides such as chloroquine when desired. Illustrative of a tablet formulation of my compounds is one weighing 660 mg. and containing 500 mg. of N-(2,2-diethoxyethyl)-N-(2,4-dichlorobenzyl)dichloroacetamide, 25 mg. of calcium carbonate as a diluent, 90 mg. of starch as a disintegrator, 30 mg. of gelatin as a binder and 15 mg. of talc as a lubricant. Illustrative of a capsule formulation is one containing 500 mg. of N-(2,2-diethoxyethyl)-N - (2,4 - dichlorobenzyl)dichloroacetamide, 40 mg. of starch and 10 mg. of talc. Other tablet and capsule formulations can be made varying the quantities of adjuvants or using other N-(2,2-dialkoxyethyl)-N-[(substituted-phenyl)alkyl]dihaloacetamides as active amebacidal ingredients.

I claim:

1. A compound having the formula

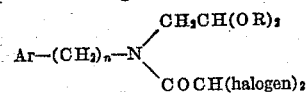

where Ar is a phenyl radical substituted by from one to three radicals selected from the group consisting of halogen, lower-alkoxy and lower-alkyl, n is an integer from 1 to 2 inclusive and R is a lower-alkyl radical.

2. A compound having the formula

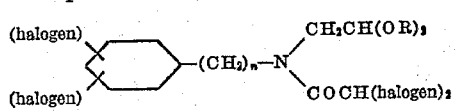

where R is a lower-alkyl radical and n is an integer from 1 to 2 inclusive.

3. A compound having the formula

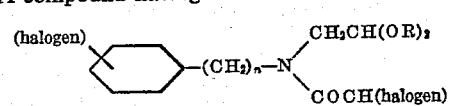

where R is a lower-alkyl radical and n is an integer from 1 to 2 inclusive.

4. A compound having the formula

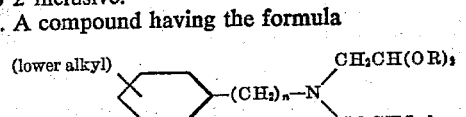

where R is a lower-alkyl radical and n is an integer from 1 to 2 inclusive.

5. A compound having the formula

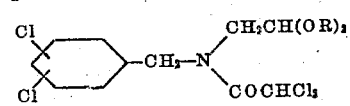

where R is a lower-alkyl radical.

6. N - (2,4 - dichlorobenzyl) - N - (2,2-diethoxyethyl)-dichloroacetamide.

7. N - (4 - isopropylbenzyl) - N - (2,2-dimethoxyethyl)-dichloroacetamide.

8. N-[2-(4-chlorophenyl)ethyl]-N-(2,2-diethoxyethyl)-dichloroacetamide.

9. The process of preparing a compound having the formula

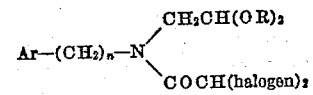

where Ar is a phenyl radical substituted by from one to three radicals selected from the group consisting of halogen, lower-alkoxy and lower-alkyl, n is an integer from 1 to 2 inclusive and R is a lower-alkyl radical, which comprises reacting an N-(2,2-dialkoxyethyl)-substituted-phenylalkylamine of the formula

$Ar-(CH_2)_n-NHCH_2CH(OR)_2$ with a dihaloacetyl halide.

10. The process of preparing N-(2,4-dichlorobenzyl)-N-(2,2-diethoxyethyl)dichloroacetamide which comprises reacting N-(2,2-diethoxyethyl)-2,4-dichlorobenzylamine with dichloroacetyl chloride.

11. The process of preparing N-(4-isopropylbenzyl)-N-(2,2-dimethoxyethyl)dichloroacetamide which comprises reacting N-(2,2-dimethoxyethyl)-4-isopropylbenzylamine with dichloroacetyl chloride.

12. The process of preparing N-[2-(4-chlorophenyl)ethyl] - N - (2,2 - diethoxyethyl)dichloroacetamide which comprises reacting N-(2,2-diethoxyethyl)-2-(4-chlorophenyl)ethylamine with dichloroacetyl chloride.

References Cited in the file of this patent

UNITED STATES PATENTS

| | | |
|---|---|---|
| 2,732,403 | Surrey | Jan. 24, 1956 |
| 2,797,242 | Edgerton et al. | June 25, 1957 |
| 2,798,888 | Chrischonaweg | July 9, 1957 |